(12) United States Patent
Gallo et al.

(10) Patent No.: US 9,773,473 B2
(45) Date of Patent: Sep. 26, 2017

(54) PHYSIOLOGICALLY BASED ADAPTIVE IMAGE GENERATION

(71) Applicant: NVIDIA CORPORATION, Santa Clara, CA (US)

(72) Inventors: Orazio Gallo, Santa Cruz, CA (US); Kari Antero Pulli, Palo Alto, CA (US); David Edward Jacobs, Westlake Village, CA (US)

(73) Assignee: NVIDIA Corporation, Santa Clara, CA (US)

( * ) Notice: Subject to any disclaimer, the term of this patent is extended or adjusted under 35 U.S.C. 154(b) by 45 days.

(21) Appl. No.: 14/722,036

(22) Filed: May 26, 2015

(65) Prior Publication Data

US 2015/0346817 A1 Dec. 3, 2015

Related U.S. Application Data

(60) Provisional application No. 62/007,351, filed on Jun. 3, 2014.

(51) Int. Cl.
| | | |
|---|---|---|
| *G06F 3/01* | (2006.01) | |
| *G09G 5/10* | (2006.01) | |
| *G09G 5/02* | (2006.01) | |

(52) U.S. Cl.
CPC ............... *G09G 5/10* (2013.01); *G09G 5/02* (2013.01); *G09G 2320/0257* (2013.01); *G09G 2320/066* (2013.01); *G09G 2354/00* (2013.01)

(58) Field of Classification Search
None
See application file for complete search history.

(56) References Cited

U.S. PATENT DOCUMENTS

| 9,087,382 B2* | 7/2015 | Zhai et al. ............... G06T 5/008 |
| 2005/0104900 A1* | 5/2005 | Toyama .................. G06T 5/007 345/629 |
| 2011/0175925 A1* | 7/2011 | Kane ......................... G01J 1/42 345/589 |
| 2012/0182278 A1* | 7/2012 | Ballestad .................. G01J 1/32 345/207 |

(Continued)

FOREIGN PATENT DOCUMENTS

| SG | WO 2010024782 A1 * | 3/2010 | ............. G06T 5/009 |
| TW | M437713 U | 9/2012 | |

OTHER PUBLICATIONS

Fain, Gordon L., et al. "Adaptation in vertebrate photoreceptors." Physiological reviews 81.1 (2001): 117-151.*

(Continued)

*Primary Examiner* — Yu Chen
(74) *Attorney, Agent, or Firm* — Zilka-Kotab, PC

(57) ABSTRACT

A system, computer-readable medium, and method are provided for generating images based on adaptations of the human visual system. An input image is received, an effect provoking change is received, and an afterimage resulting from a cumulative effect of human visual adaptation is computed based on the effect provoking change and a per-photoreceptor type physiological adaptation of the human visual system. The computed afterimage may include a bleaching afterimage effect and/or a local adaptation afterimage effect. The computed afterimage is then accumulated into an output image for display.

20 Claims, 10 Drawing Sheets

(56) References Cited

U.S. PATENT DOCUMENTS

2015/0078661 A1* 3/2015 Granados ............... G06T 5/009
382/167

OTHER PUBLICATIONS

Oberwinkler, Johannes, and Doekele G. Stavenga. "Calcium transients in the rhabdomeres of dark-and light-adapted fly photoreceptor cells." The Journal of Neuroscience 20.5 (2000): 1701-1709.*
Yamauchi, Takuya, et al. "Improvement and evaluation of real-time tone mapping for high dynamic range images using gaze information." Asian Conference on Computer Vision. Springer Berlin Heidelberg, 2010.*
E Jacobs, David, et al. "Simulating the Visual Experience of Very Bright and Very Dark Scenes." ACM Transactions on Graphics (TOG) 34.3 (2015): 25.*
Office Action from Taiwan Application No. 104117605, dated Mar. 14, 2016.
Ferwerda, J. A., et. al., "A model of visual adaptation for realistic image synthesis," In Proceedings of ACM SIGGRAPH, 1996, pp. 1-10.
Irawan, P., et. al. "Perceptually based tone mapping of high dynamic range image streams," In Proceedings of Eurographics Symposium on Rendering 2005, Jun. 2005, pp. 1-12.
Jensen, H. W., et. al., "Night rendering," 2000, pp. 1-10, retrieved from http://graphics.ucsd.edu/~henrik/papers/night/night.pdf.
Kirk, A. G. et. al. "Perceptually based tone mapping for low-light conditions," ACM Transactions on Graphics, Proceedings of ACM SIGGRAPH 2011, vol. 30, No. 4, Jul. 2011, pp. 1-54.
Pattanaik, S. N., et. al., "Time-dependent visual adaptation for fast realistic image display," 2000, pp. 1-8, retrieved from www.cs.ucf.edu/~sumant/publications/sig00.pdf.
Rahardja, S., et. al., "Eye HDR: Gaze-adaptive system for displaying high-dynamic-range images," In ACM SIGGRAPH ASIA 2009 Art Gallery & Emerging Technologies, 2009, p. 1.
Ritschel, T., et. al., "Temporal Glare: Real-Time Dynamic Simulation of the Scattering in the Human Eye," In Proceedings of Eurographics 2009, vol. 28, No. 2, 2009, pp. 1-10, retrieved from https://www.mpi-inf.mpg.de/~ritschel/Papers/TemporalGlare.pdf.
Thompson, W. B., et. al., "A spatial post-processing algorithm for images of night scenes," Journal of Graphics Tools, vol. 7, Issue 1, Nov. 2002, pp. 1-11, retrieved from www.cs.utah.edu/~shirley/papers/nighttone.pdf.
Wanat, R. et. al. "Simulating and compensating changes in appearance between day and night vision," ACM Transactions on Graphics, ACM SIGGRAPH 2014, vol. 33, Issue 4, 2014, pp. 1-12, retrieved from luminance-retargeting.bangor.ac.uk/wanat14lum_retargeting.pdf.
Mikamo, M., et. al. "Perceptually inspired afterimage synthesis," Computers & Graphics, Jun. 2013, pp. 1-11, retrieved from http://www.ibe.kagoshima-u.ac.jp/~mikamo/Publications/PIAS/PerceptuallyInspiredAfterimageSynthesis.pdf.
Ritschel, T. et. al. "A computational model of afterimages," Eurographics 2012, vol. 31, No. 2, 2012, pp. 1-6.
Guenter, B., et. al. "Foveated 3D graphics," ACM Transactions on Graphics, 2012, pp. 1-10, retrieved from http://research.microsoft.com/pubs/176610/foveated_final15.pdf.
Luebke, D. et. al. "Perceptually driven simplification for interactive rendering," Eurographics 2001, pp. 1-12, retrieved from http://www.cs.virginia.edu/~gfx/pubs/perceptual_simplification_1/egrw2001.pdf.
Seetzen, H., et. al. "High dynamic range display systems," ACM Transactions on Graphics, 2004, pp. 1-9, retrieved from anyhere.com/gward/papers/Siggraph04.pdf.

* cited by examiner

Input Image 430
435

Bleached Afterimage 440
445

Output Image 450

PHYSIOLOGICALLY BASED ADAPTIVE IMAGE GENERATION

CLAIM OF PRIORITY

This application claims the benefit of U.S. Provisional Application No. 62/007,351, titled "GAZE-AWARE DISPLAY DEVICES," filed Jun. 3, 2014, the entire contents of which is incorporated herein by reference.

FIELD OF THE INVENTION

The present invention relates to image generation, and more specifically to generating images based on adaptations of the human visual system.

BACKGROUND

The human visual system can operate in a wide range of illumination levels, due to several adaptation processes working in concert. For the most part, these adaptation mechanisms are transparent, leaving the observer unaware of his or her absolute adaptation state. At extreme illumination levels, however, some of these mechanisms produce perceivable secondary effects, or epiphenomena. In bright light, these secondary effects include bleaching afterimages and adaptation afterimages, while in dark conditions these include desaturation, loss of acuity, mesopic hue shift, and the Purkinje effect.

Standard displays, such as computer monitors, can reproduce only a fraction of the dynamic range typically encountered in natural environments. Images and videos viewed on conventional displays, therefore, generally do not engage the luminance adaptation mechanisms that the visual system regularly undergoes in real environments. For a display to realistically reproduce the visual experience of high-dynamic-range (HDR) content, it would be desirable to also reproduce the visual experience associated with adapting to a wide dynamic range.

One way to tackle this problem is to design monitors that support larger bit-depths and maximum brightnesses (i.e., luminances), thus placing the burden of performing adaptation on the observer's visual system. However, aside from the complications of turning such prototypes into commercial products, some limitations are inherently unsolvable; e.g., if very bright objects are displayed with proportionally strong radiances on the screen, the viewer may experience discomfort. Moreover, such strategies only address the case of very bright scenes, whereas a display accurately reproducing an extremely low-light scene could only be viewed in total darkness, as any ambient light would prevent the viewer from completely adapting to the display.

Thus, there is a need for addressing these issues and/or other issues associated with the prior art.

SUMMARY

A system, computer-readable medium, and method are provided for generating images based on an adaptation of the human visual system. An input image is received, an effect provoking change is received, and an afterimage resulting from a cumulative effect of human visual adaptation is computed based on the effect provoking change and a per-photoreceptor type physiological adaptation of the human visual system. The computed afterimage may include a bleaching afterimage effect and/or a local adaptation afterimage effect. The computed afterimage is then accumulated into an output image for display.

DETAILED DESCRIPTION

Secondary effects induced by bright light conditions may include bleaching afterimages and adaptation afterimages (i.e., local adaptation effects). In dark conditions, the secondary effects may include desaturation, loss of acuity, mesopic hue shift, and the Purkinje effect. Displaying the secondary effects explicitly may be used to extend the perceived dynamic range of a conventional computer display. A phenomenological model may be developed for each secondary effect, and computer graphics methods may be used to render each model. Knowledge of the human visual system may be used to develop the phenomenological models to a level of approximation at which naïve observers may confuse the rendered models displayed on a conventional computer monitor with naturally occurring epiphenomena.

One important property of afterimages is that they follow the observer's gaze. Therefore, in one embodiment, a gaze-adaptive display may be used to inject one or more secondary effects into imagery on a conventional computer monitor. A display system may track a user's gaze and adapt the image rendition accordingly, injecting one or more physiologically-motivated artifacts, including adaptation to global light levels, retinal afterimages (both those due to adaptation and to the bleaching of the photopigments), visual acuity loss in low-light conditions, the Purkinje shift, and the mesopic hue shift into an image for display. The fovea, the area from which we get most of our visual acuity, does not contain any rods. Therefore, in low-light conditions the central part of our visual field is completely blind; the brain fills it in based on information from the neighboring areas. A complete simulation includes locking a blind spot (black disk) to the gaze position, so as to allow the brain to perform its regular task.

Figure 1:
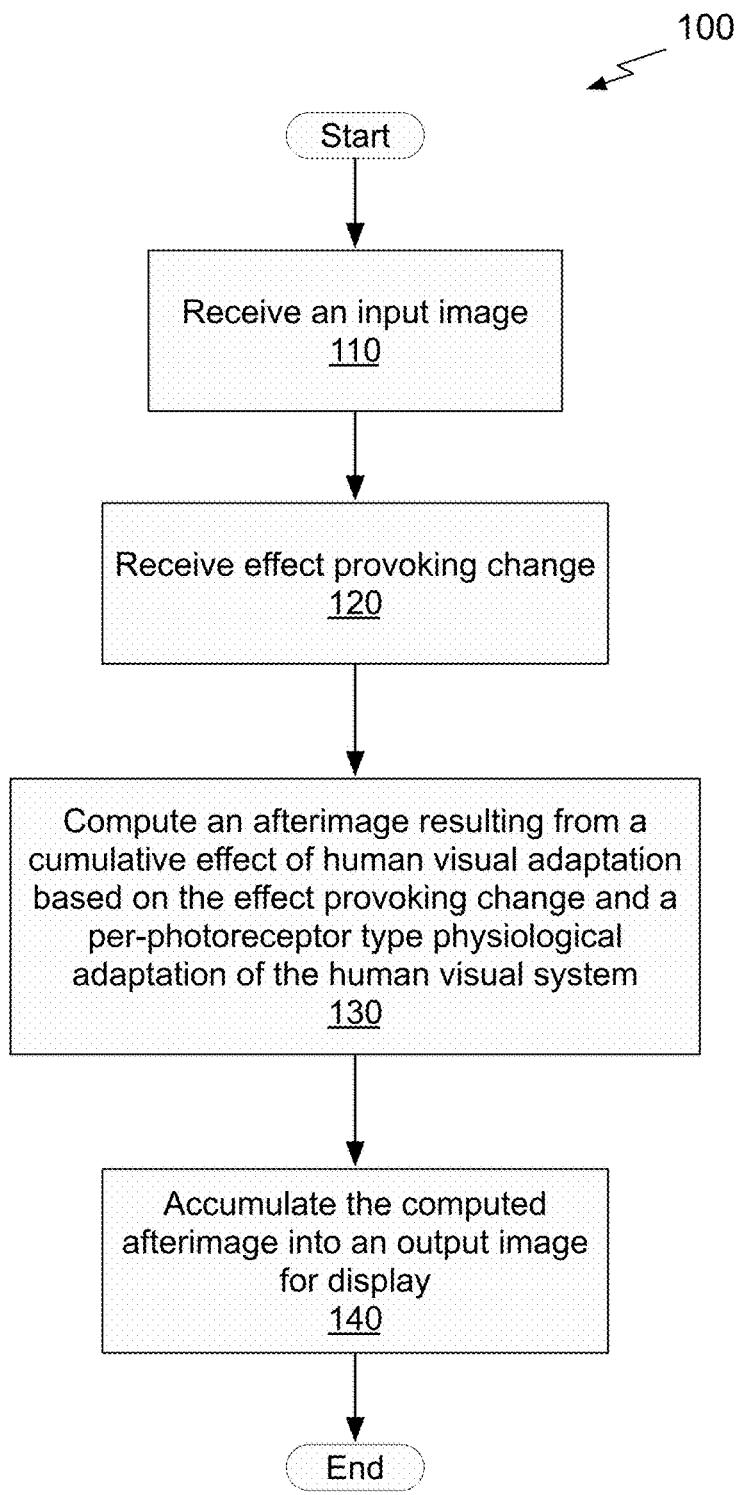
FIG. 1 illustrates a flowchart of a method for producing an image based on based on an adaptation of the human visual system, in accordance with one embodiment.

FIG. 1 illustrates a flowchart of a method 100 for producing an image based on adaptations of the human visual system, in accordance with one embodiment. At step 110, an input image is received. In one embodiment, the input image may comprise different levels of illumination so that one or more regions are brightly lit while other areas of the input image may be dark. At step 120, an effect provoking change is received. In the context of the current description, an effect provoking change may be a change in the position of a viewer's gaze or a stimulus input. A position on a display screen at which a viewer's gaze is directed may change from a first position to a second position as the gaze of the viewer changes. When the first position is associated with a bright portion of the image and the second position is associated with a dim portion of the image, a bleaching afterimage effect may result. A stimulus input may include a change between the input image and an output image. For example, a change in global illumination such as a darkening (e.g., eclipse) or a change in camera position.

At step 130, an afterimage resulting from a cumulative effect of human visual adaptation is computed based on the effect provoking change and a per-photoreceptor type physiological adaptation of the human visual system. In the context of the present description, a photoreceptor is a rod or cone of the eye and a type corresponds to the (one) rod type or cone type (e.g., S, M, and L cone types). Each type of cone corresponds to a channel, which may be a channel of a color space, such as the LMS color space. A value in the LMS color space may be converted to the RGB color space. In one embodiment, the computed afterimage is a bleaching afterimage and/or a local adaptation effect. At step 140, the computed afterimage is accumulated into an output image for display. In one embodiment, one or more additional secondary effects may be modeled and accumulated into the output image. In one embodiment, the input image may also be accumulated into the output image, such as when the viewer's gaze changes and the camera position does not change. In one embodiment, the output image has a different camera position compared with the input image. In one embodiment, the output image has different global illumination compared with the input image.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Although the focus of the secondary effect modeling described herein is on the extreme ends of the illumination spectrum, a thorough analysis includes the mechanisms that govern adaptation and dynamic range compression throughout the full range of luminance. These mechanisms include the pupillary reflex, neural adaptation at various levels of the brain, center-surround photoreceptor signal encoding, and chemical adaptation of the photoreceptors themselves. The net effect of all these mechanisms is to parameterize a function that maps a large dynamic range in the world to a smaller range of electrical signals sent elsewhere in the brain, that is, a tonemapping function. The tonemapping function may be used as the base on which the modeled secondary effects are applied.

Perceptually-motivated tonemapping functions have been extensively studied. Many modeling techniques share some variation on the Naka-Rushton equation that predicts the instantaneous response of a photoreceptor to a new stimulus after being adapted to a particular background illumination. The Naka-Rushton response R(I) is given by $$R(I) = \frac{I^n}{I^n + \sigma^n} \qquad \text{Equation (1)}$$

where I is the luminance of the stimulus, n is a contrast control, and σ a is the intensity at which the response of the photoreceptor is equal to one half. In one embodiment n=0.7. In the log-domain, Equation (1) represents an S-curve, or a soft step function. The adaptation state is encoded in aσ. If a steady stimulus $\bar{I}$ is applied, the response will weaken and eventually rest at a value given by a plateau function M($\bar{I}$). The appropriate σ for a background illumination $\bar{I}$ may be computed by setting R($\bar{I}$)=M($\bar{I}$) to get $$\sigma(\bar{I}) = \left( \frac{\bar{I}^n}{M(\bar{I})} - \bar{I}^n \right)^{1/n} \qquad \text{Equation (2)}$$

The plateau function M($\bar{I}$) can be measured and has a form similar to Equation (1).

Equations (1) and (2) can be treated together as a tonemapping curve, which is applied globally to the photopic luminance channel of the image. The final displayed pixel value is J=R(I)γ, where γ is chosen to compensate for non-linearity in the display's response. In one embodiment γ=0.455. Color images may be handled by enforcing a consistent ratio between color channels before and after the tonemapping curve is applied.

The user's current adaptation state may be represented as the illumination level A (in log-units) to which he or she is adapted. In one embodiment, A is determined from the history of the user's gaze positions and the content of the scene. Let the log of the average scene luminance in a small patch around the user's gaze position be called the target $A_T$. For a timestep of duration $\Delta t$, the updated adaptation state $A'$ is determined by moving $A$ towards $A_T$ as follows $$A' \leftarrow \begin{cases} A + a_1 \Delta t, & A < A_T \\ A - a_2 \Delta t, & A > A_T \end{cases} \quad \text{Equation (3)}$$

where $a_1$ and $a_2$ are the rates of adaptation to brighter and darker stimuli, respectively. In one embodiment the adaptation rate to brighter stimuli $a_1=0.2$ and the adaptation rate to darker stimuli $a_2=0.75$. A model may include separate adaptation rates for the two directions (e.g., increasing luminance, decreasing luminance) because the visual system takes longer to adapt to dark environments than to bright ones. If the update step would cause $A'$ to overshoot its target $A_T$ in either direction, $A'$ may be set it equal to $A_T$. $A'$ can then be converted to linear luminance $\bar{I}$ and used in Equation (2) to appropriately parameterize the tone-mapping curve. The effect of simulated global adaptation computed using Equations (1), (2), and (3) is to darken the scene overall when a relatively bright point is fixated upon by a user and to brighten the scene when a relatively dark point is fixated upon by the user.

The technique for computing simulated global adaptation described above computes only the expected response of the early visual system when exposed to a particular scene. Ultimately, reproducing the appearance of such a scene in the visual system of the viewer is important, which requires compensating for the properties of both the display and the viewer's real-world visual system. In one embodiment, a global adaptation model makes the simplifying assumption that photoreceptor response and visual appearance are equivalent, and is still able to produce results of good quality (i.e., believable images into which the epiphenomena models can be injected).

In an effort to provide a viewer with the perception of looking at radiances brighter than the physical capabilities of a display, synthetic afterimages are rendered based on phenomenological models and displayed on a conventional display. "Afterimage" is a general term used to describe any latent image of a real-world object that persists after the original stimulus ceases. After being induced, they are "locked" to a region of the retina and will therefore move with the viewer's gaze, until they completely fade. Afterimages may vary in strength and appearance depending upon the nature of the stimulus that induced the afterimage. For example, a short-duration, very bright, color-neutral source like a camera flash will produce a strong cyan afterimage, fading to green, and finally to magenta. Alternatively, fixating on a dark, color-neutral region enhances the receptors' sensitivity, while fixating on a solid color will induce a cast of the opponent color (e.g., a red stimulus produces a cyan cast).

Bleaching afterimages are caused by extremely bright light sources, such as a camera flash. To observe a bleaching afterimage most clearly, watch a camera flash firing from a safe distance (1-2 meters), then quickly close your eyes and cover them with your hand. Depending on the brightness of the flash, you should see a bright green or cyan afterimage that slowly fades to a pink or deep purple color.

Figure 2A:
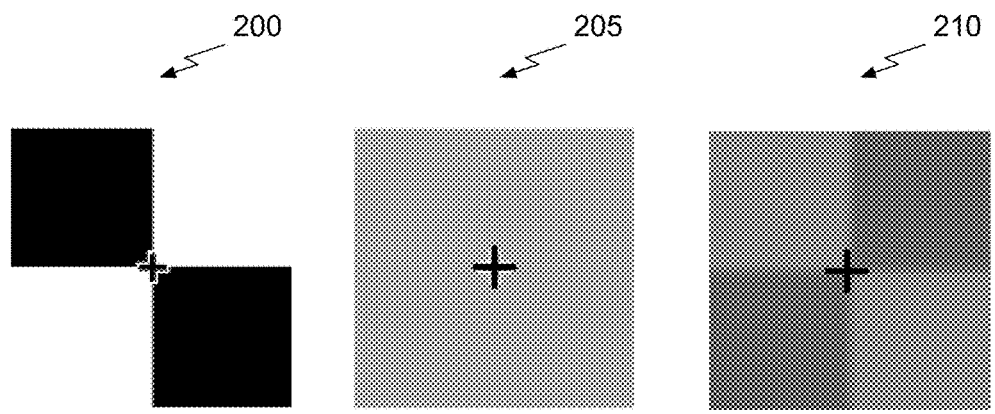
FIG. 2A illustrates a black-and-white input image, an output image, and a local adaptation effect afterimage, in accordance with one embodiment.

FIG. 2A illustrates a black-and-white input image 200, an output image 205, and a local adaptation effect afterimage 210, in accordance with one embodiment. Adaptation afterimages are produced by long fixations on steady stimuli. To induce an adaptation afterimage, fixate on the cross at the center of input image 200 for several seconds and then fixate on the cross at the center of the output image 205. You should see a faint checkerboard pattern with the brightness relationships of the quadrants reversed, similar to the local adaptation effect afterimage 210. Note that the local adaptation effect afterimage 210 is not strictly brighter or darker than the background, but rather brighter for some parts and darker for others.

Figure 2B:
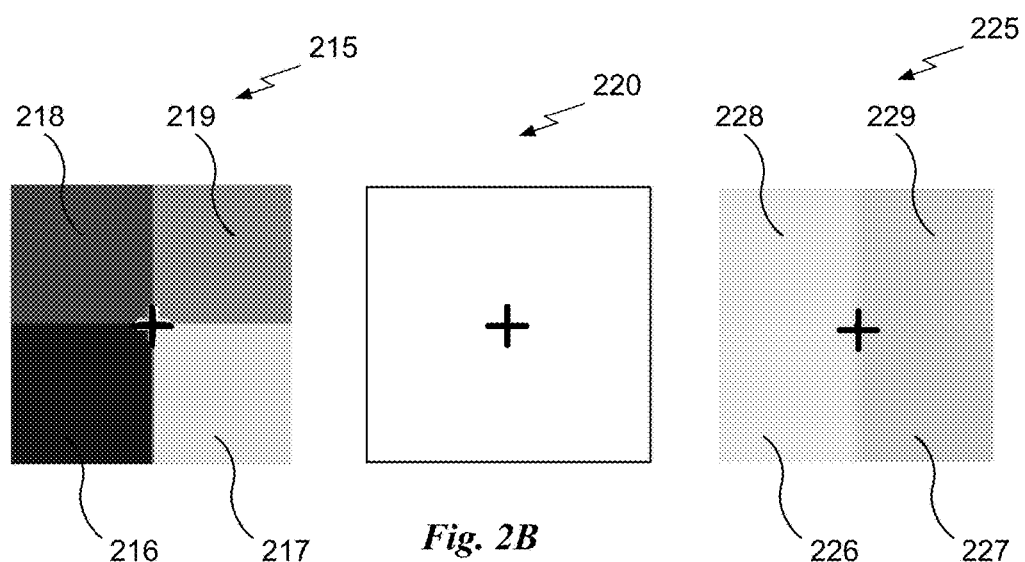
FIG. 2B illustrates a color input image, an output image, and a local adaptation effect afterimage, in accordance with one embodiment.

FIG. 2B illustrates a color input image 215, an output image 220, and a local adaptation effect afterimage 225, in accordance with one embodiment. To induce a color adaptation afterimage, fixate on the cross at the center of input image 215 for several seconds and then then fixate on the cross at the center of the output image 220. You should see a faint checkerboard pattern having colors similar to the local adaptation effect afterimage 225 (i.e., a color-opponent afterimage).

The color in each of the quadrants of the local adaptation effect afterimage 225 is the opponent color of the corresponding quadrant of the input image 215. For example, when a first quadrant 218 of the input image 215 is red, a first quadrant 228 of the local adaptation effect afterimage 225 is cyan. When a second quadrant 219 of the input image 215 is green, a second quadrant 229 of the local adaptation effect afterimage 225 is red. When a third quadrant 216 of the input image 215 is blue, a third quadrant 226 of the local adaptation effect afterimage 225 is green. When a fourth quadrant 217 of the input image 215 is yellow, a fourth quadrant 227 of the local adaptation effect afterimage 225 is magenta.

The distinct appearance of the two kinds of afterimages (e.g., bleaching and local adaptation afterimages) result from a physiological process known as phototransduction. Phototransduction is a process by which photoreceptors convert light into electrical signals. Photoreceptors contain hundreds of thousands of light-sensitive proteins called photopigments. The aggregate behavior of these photopigments determines the response of the photoreceptor. The photopigment life-cycle can explain a particular kind of afterimage referred to as a bleaching afterimage. Shortly after being struck by photons, photopigments enter a bleached state, where they are no longer sensitive to light, but continue to contribute to the photoreceptor's response. Consequently, the photoreceptor continues producing a response even after the end of the stimulus, i.e., the photoreceptor produces an afterimage. Eventually, bleached photopigments are restored to a receptive idle state, which ceases their contribution to the transduction cascade and therefore to the afterimage. Similarly, when exposed to a stimulus, the phototransduction cycle, as well as neural adaptation at different levels of the visual pathway, adapt to the stimulus level; that affects the signals produced by subsequent stimuli. For instance, a prolonged bright stimulus will induce a lower sensitivity: this lower gain will cause a new darker stimulus to appear even darker.

Figure 2C:
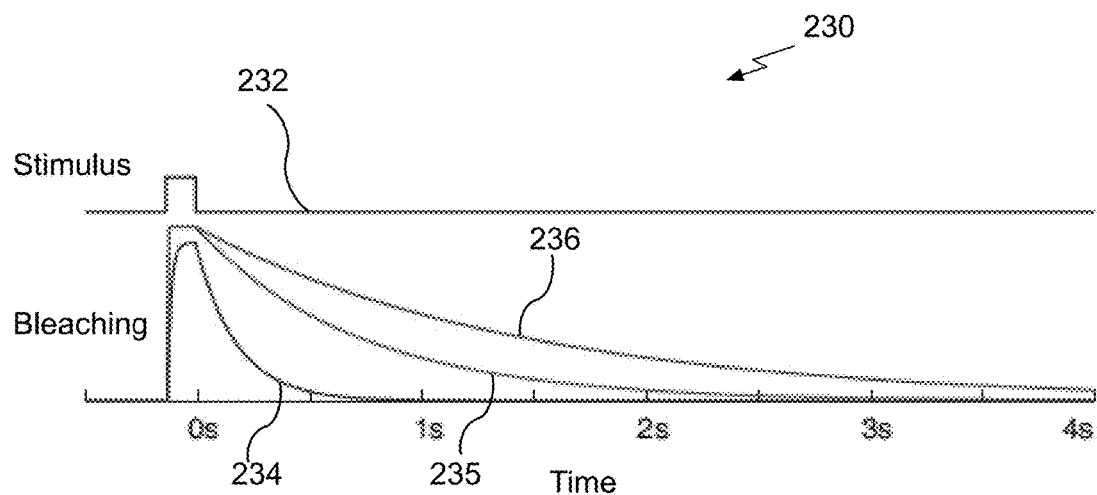
FIG. 2C illustrates a graph of per-color component human visual system photoreceptor bleaching effects over time, in accordance with one embodiment.
Figure 2D:
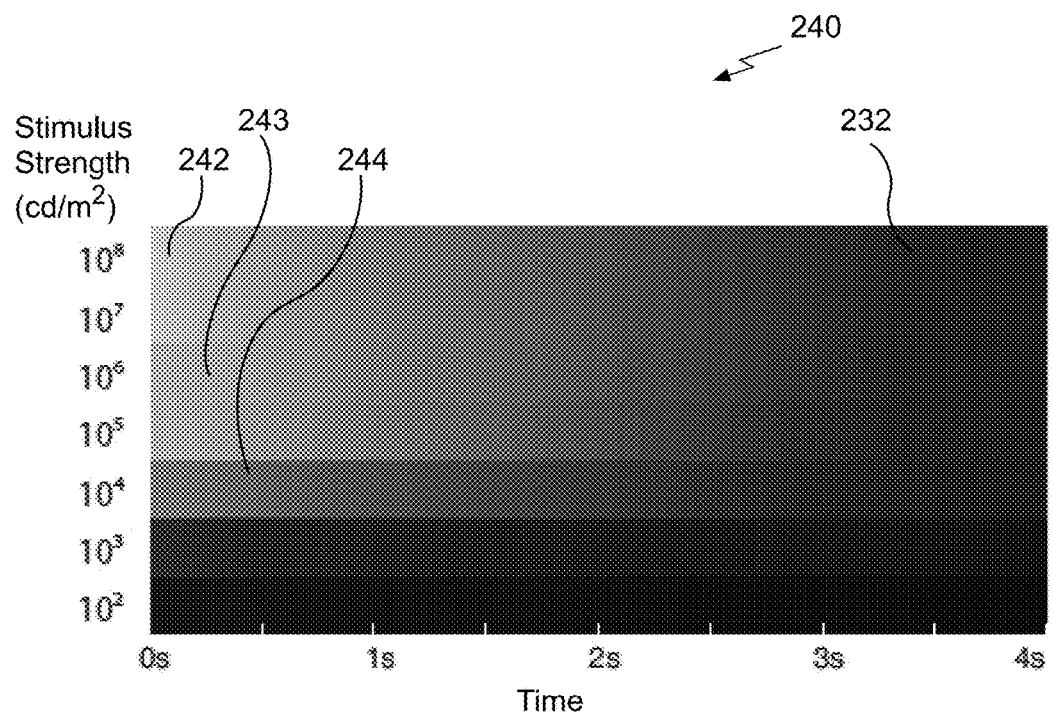
FIG. 2D illustrates bleaching afterimages over time associated with the graph shown in FIG. 2C, in accordance with one embodiment.

The bleaching afterimages are positive, meaning they are always brighter than the background on which they are superimposed. A bright background, however, can easily mask a bleaching afterimage induced by a stimulus of similar brightness. The appearance of a bleaching afterimage varies with time (as shown in FIGS. 2C and 2D) and with the radiance of the light source (as shown in FIG. 2D). The time-dependent nature of afterimage appearances has been well-studied and is commonly referred to as the "flight of colors". Importantly, the variation of colors over time and in response to stimulus levels has not been modeled to produce images for display. In one embodiment, the photoreceptor model is represented by the decaying exponential curves.

FIG. 2C illustrates a graph 230 of per-color component human visual system photoreceptor bleaching effects over time 230, in accordance with one embodiment. Bleaching afterimages are caused by sources of light that are bright enough to bleach large portions of photopigments in a photoreceptor. A bright stimulus 232 "bleaches" a portion of a photoreceptor's photopigments; these molecules remain bleached even after the stimulus is removed. The graph 230 shows the predicted bleaching levels over time of an L-, M-, and S-cone (shown as line 236, 235, and 234, respectively) exposed to a ⅛ second (s), $10^7$ candela/meter$^2$ (cd/m$^2$), white (stimulating all cone types equally) flash, ending at time t=0 s. As shown in FIG. 2C, the responses for the cone types are each represented by a different decaying exponential curve.

FIG. 2D illustrates a graphic 240 of the predicted appearance of bleaching afterimages over time associated with the graph 230 shown in FIG. 2C, in accordance with one embodiment. The bleaching levels of the three cone types determines the appearance of a bleaching afterimage. The bleaching afterimages predicted appearance over time shown in the graphic 240 are estimated in response to brief flashes ending at time t=0 s is shown for a range of stimulus strengths (i.e., flash intensities). As the intensity of the flash increases, the bleaching afterimages increasingly start from cyan 242, always fading to dark magenta 232. The corresponding afterimage color appearance for the bleaching levels shown in FIG. 2C is shown below in the $10^7$ cd/m$^2$ line of FIG. 2D. At lower levels of flash intensity, the bleaching afterimages start from magenta 244 and fade to the dark magenta 232. The sudden transition shown in graphic 240 at a first level of intensity (e.g., between $10^4$ and $10^5$ cd/m$^2$) may be a result of the relatively strong impact M-cones have on the final RGB afterimage appearance. In the graphic 240, a first hint of green begins appearing around a second level of intensity (e.g., $10^{4.5}$ cd/m$^2$). At levels of flash intensity in the graphic 240 near a third level of intensity (e.g., $10^5$ and $10^6$ cd/m$^2$), the bleaching afterimages start from green 243 and transition to the dark magenta 232.

The bleaching level B of a photoreceptor as the fraction of photopigments in the bleached state. The fraction of bleached pigments increases as incident light strikes idle pigments and decreases as bleached pigments are restored to their idle state. The differential change in bleaching level induced by a stimulus is predicted by $$\frac{dB}{dt} = b_1(1-B)I - b_2 B \quad \text{Equation (4)}$$

where $b_1$ is a bleaching sensitivity parameter, I is the incident luminance, and $b_2$ is the recovery rate of the photoreceptor's pigments. The parameters governing the three cone types' bleaching behaviors are selected to produce phenomenologically plausible afterimages. In one embodiment, the LMS photopigment bleaching rate $b_1=1.2\times 10^{-3}$, $1.4\times 10^{-4}$, and $5.5\times 10^{-7}$ for the L, M, and S cones, respectively. In one embodiment, the LMS photopigment bleaching rate $b_2=6.9\times 10^{-1}$, $1.4\times 10^0$, and $5.5\times 10^0$ for the L, M, and S cones, respectively. Equation (4) is solved analytically to find the updated bleaching level B' after a simulation timestep of size $\Delta t$ as $$B' \leftarrow (B-B_\infty)e^{-(b_1 I + b_2)\Delta t} + B_\infty \quad \text{Equation (5)}$$

where $B_\infty$ is the equilibrium bleaching level assuming a constant stimulus, given by $$B_\infty = \frac{b_1 I}{b_1 I + b_2} \quad \text{Equation (6)}$$

At the equilibrium state for any given light level a photoreceptor will have some portion ($B_\infty$) of its photopigment bleached. For the model is assumed that the contribution of these bleached pigments to the overall response of the photoreceptor is normally imperceptible and it may be considered to be implicitly included as part of Equation (1). Therefore, to compute how visible a bleaching afterimage should be, the deviation from the equilibrium bleaching level is used rather than the absolute bleaching level. Specifically, to compute the linear brightness J for an output pixel, bleaching is added to the default photoreceptor output $$J = R(I) + j_1 \cdot \max(B-B_\infty, 0) \quad \text{Equation (7)}$$

where $j_1$ is a parameter controlling the strength of the bleaching afterimages. In one embodiment, the bleaching afterimage strength parameter $j_1=0.03$. Equation (7) is computed for each color component of the display color space (e.g., RGB, or the like) to account for the different time dynamics of the L, M, and S cones. The linear brightness may be be modified by a gamma transform for display.

In practice, Equation (7) is computed for each cone type separately. In one embodiment, the input image is to the LMS colorspace before Equation (7) is computed. Each type of cone has different bleaching and recovery parameters, which, after converting back to RGB, results in colorful, temporally-changing afterimages ("flight of colors"). In one embodiment the matrix $$H = \begin{bmatrix} 1.14 & -1.18 & 0.36 \\ -0.08 & 1.02 & 0.18 \\ 0.30 & -0.11 & 1.25 \end{bmatrix}$$

is used to convert the LMS colorspace values to RGB space. The appearance of the bleaching afterimages may be tuned by modifying $b_1$ and $b_2$ for each photoreceptor type.

Figure 3A:
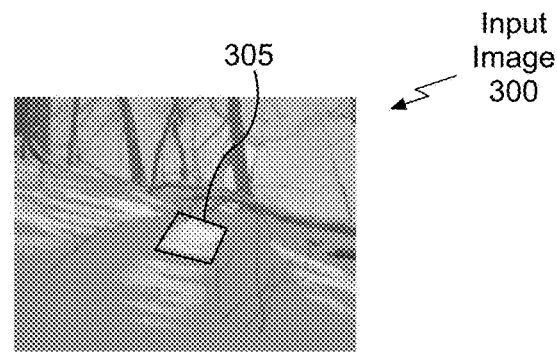
FIG. 3A illustrates a prior art input image to induce a bleaching afterimage effect.

FIG. 3A illustrates a prior art input image 300 that induces a bleaching afterimage effect. The prior art image is from Fairchild, M. D., 2008, *The HDR Photographic Survey* MDF Publications. In particular the bright region 305 induces a green afterimage effect that darkens and changes to dark magenta over time. The maximum radiance of the input image 300 is approximately 4.5 log cd/m$^2$.

Figure 3B:
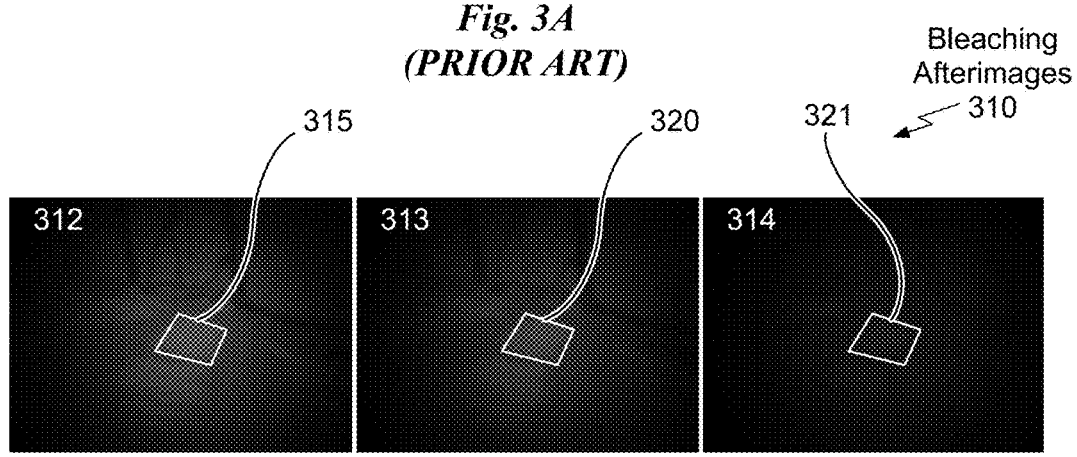
FIG. 3B illustrates bleaching afterimages associated with the input image shown in FIG. 3A at different points in time, in accordance with one embodiment.

FIG. 3B illustrates bleaching afterimages 310 associated with the input image 300 shown in FIG. 3A at different points in time, in accordance with one embodiment. The appearance of bleaching afterimages 310 as predicted by the model may be simulated by a viewer shutting his or her eyes after a brief exposure to the input image 300 (i.e., the scene radiance is dropped to zero). The appearance of the afterimage t seconds after the "blink" is shown in FIG. 3B. The bleaching afterimages 312, 313, and 314 correspond to t=1/60 s, 0.5 s, and 2 s after the "blink", respectively. The viewer gaze position is held constant—recall that afterimages will move with the viewer's gaze position. These scenes are representative of the range of bleaching afterimage appearances the model can produce. In particular, cyan, green, and magenta elements are present in the bleaching afterimages 312, 313, and 314. In the bleaching afterimage 312, the region 315 corresponding to the region 305 in the input image 300 appears as green and the surrounding region is magenta. In the bleaching afterimage 313, the region 320 corresponding to the region 305 in the input image 300 appears as a darker green than the region 315 and the surrounding region is darker magenta. In the bleaching afterimage 314, the region 321 corresponding to the region 305 in the input image 300 appears as a dark magenta and the surrounding region is black.

Figure 3C:
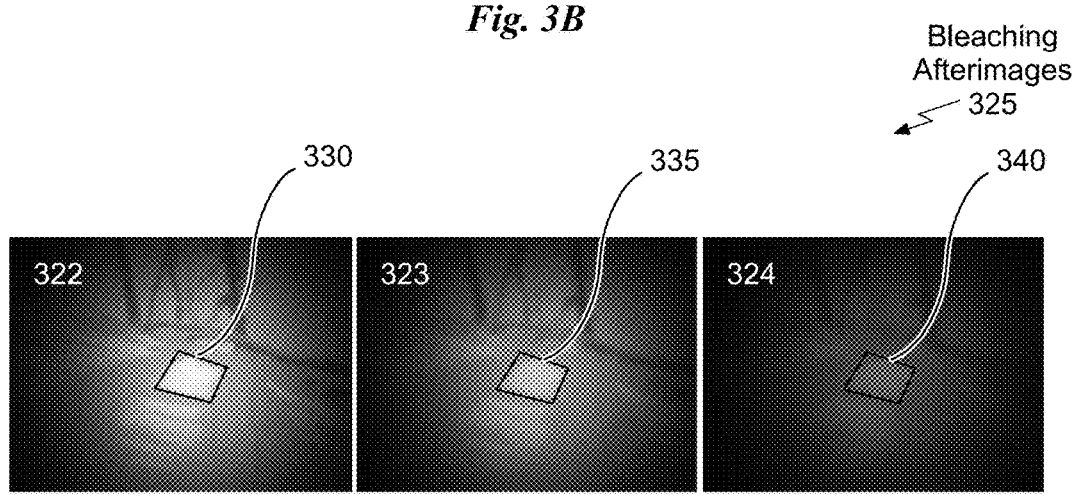
FIG. 3C illustrates prior art bleaching afterimages associated with the input image shown in FIG. 3A at different points in time.

FIG. 3C illustrates prior art bleaching afterimages 325 associated with the input image 300 shown in FIG. 3A at different points in time. The bleaching afterimages 322, 323, and 324 correspond to t=1/60 s, 0.5 s, and 2 s after the "blink", respectively. To simulate a realistic afterimage, different time dynamics of the L, M, and S cones should be accounted for in the model. Additionally, the afterimage is computed after performing a color opponency transform. As a result, the afterimages of a color-neutral stimulus synthesized by the prior art model are neutral as well, and fail to capture the colorful nature of the bleaching afterimages shown in FIG. 3B. In the bleaching afterimage 322, the region 330 corresponding to the region 305 in the input image 300 appears as white and the surrounding region is light grey. In the bleaching afterimage 323, the region 335 corresponding to the region 305 in the input image 300 appears as a light grey and the surrounding region is darker grey. In the bleaching afterimage 324, the region 340 corresponding to the region 305 in the input image 300 appears as a dark grey and the surrounding region is darker grey and black.

Figure 3D:
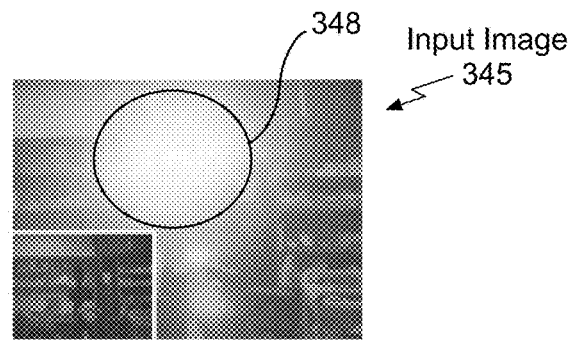
FIG. 3D illustrates another input image to induce a bleaching afterimage effect, in accordance with one embodiment.

FIG. 3D illustrates an input image 345 that induces a bleaching afterimage effect, in accordance with one embodiment. In particular the bright region 348 (e.g., white flash) induces a green and magenta afterimage effect that darkens and changes to dark magenta over time. The maximum radiance of the input image 345 is approximately 8.5 log cd/m$^2$.

Figure 3E:
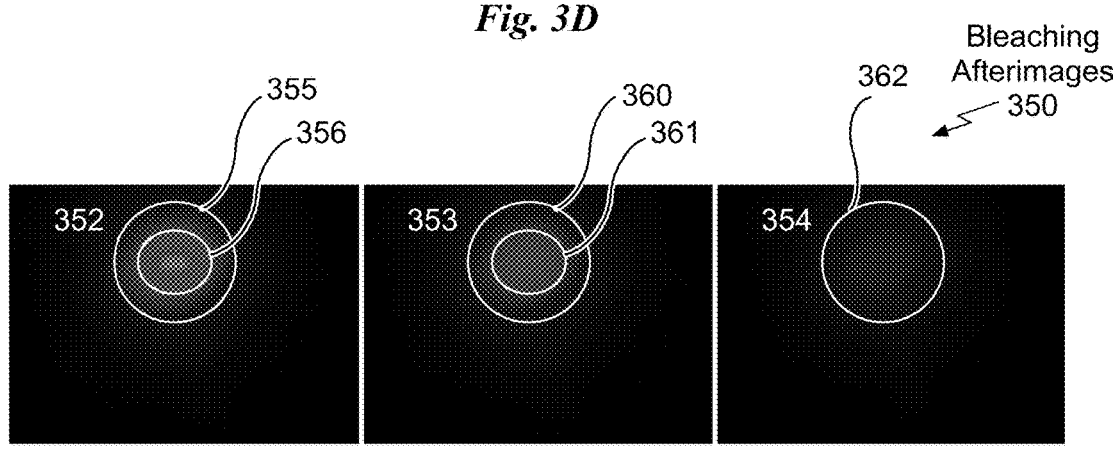
FIG. 3E illustrates bleaching afterimages associated with the input image shown in FIG. 3D at different points in time, in accordance with one embodiment.

FIG. 3E illustrates bleaching afterimages 350 associated with the input image 345 shown in FIG. 3D at different points in time, in accordance with one embodiment. The appearance of bleaching afterimages 350 as predicted by the model may be simulated by a viewer shutting his or her eyes after a brief exposure to the input image 345 (i.e., the scene radiance is dropped to zero). The appearance of the afterimage t seconds after the "blink" is shown in FIG. 3E. The bleaching afterimages 352, 353, and 354 correspond to t=1/60 s, 0.5 s, and 2 s after the "blink", respectively. The viewer gaze position is held constant. These scenes are representative of the range of bleaching afterimage appearances the model can produce. In particular, cyan, green, and magenta elements are present in the bleaching afterimages 352, 353, and 354. In the bleaching afterimage 352, the region 356 corresponding to the region 348 in the input image 345 appears as magenta and the interior region 356 is green. In the bleaching afterimage 353, the region 360 corresponding to the region 348 in the input image 345 appears as a darker magenta than the region 355 and the interior region 361 is darker green than the interior region 356. In the bleaching afterimage 354, the region 362 corresponding to the region 348 in the input image 345 appears as a very dark magenta and the surrounding region is black.

Figure 3F:
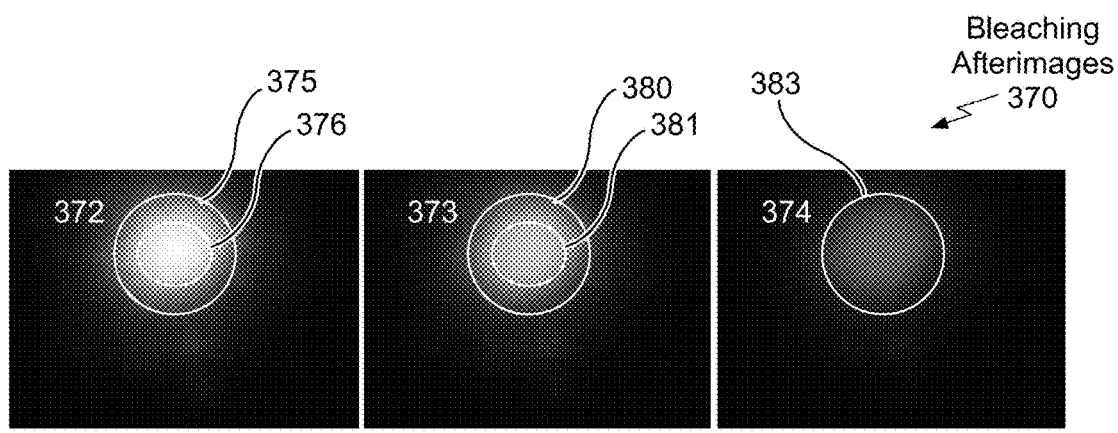
FIG. 3F illustrates prior art bleaching afterimages associated with the input image shown in FIG. 3D at different points in time.

FIG. 3F illustrates prior art bleaching afterimages associated with the input image shown in FIG. 3D at different points in time. The bleaching afterimages 372, 373, and 374 approximately correspond to t=1/60 s, 0.5 s, and 2 s after the "blink", respectively. The different time dynamics of the L, M, and S cones are not accounted for in the prior art model. Additionally, the afterimage is computed after performing a color opponency transform. As a result, the afterimages of a color-neutral stimulus synthesized by the prior art model are neutral as well, and fail to capture the colorful nature of the bleaching afterimages shown in FIG. 3E. In the bleaching afterimage 372, the region 355 corresponding to the region 348 in the input image 345 appears as light grey and the interior region 376 is white. In the bleaching afterimage 373, the region 380 corresponding to the region 348 in the input image 345 appears as a medium grey and the interior region 381 is light grey. In the bleaching afterimage 374, the region 383 corresponding to the region 348 in the input image 345 appears as a dark grey and the surrounding region is black.

Another type of afterimage is a local adaptation afterimage that can be partially attributed to the role of calcium ions as a regulating chemical in transduction. The role of calcium in phototransduction is complex and remains an active area of research. However, a net effect equivalent to a simple gain may be assumed because of the strong correlation between calcium concentration and the overall sensitivity of the cell. The calcium influx and efflux rates are finite, so changes in the cell's calcium concentration will lag behind a changing stimulus, temporarily boosting or weakening photoreceptor's response until it can reach a new equilibrium, i.e., producing an afterimage.

Existing computational models for simulating afterimages do not explicitly distinguish between the two kinds of afterimages, bleaching and local adaptation afterimages and therefore fails to reproduce important behaviors. As described further herein, a unified model may be used for bleaching and local adaptation afterimages. While the appearance of the bleaching and local adaptation epiphenomena is certainly influenced by higher-level visual processing, in one embodiment, the model represents only the photoreceptor level for two reasons: (1) the physiology governing retinal contributions to afterimages is better understood, and (2) a photoreceptor-centric model is sufficient for producing believable afterimages.

Local adaptation afterimages are caused by exposures to stimuli lasting long enough for individual photoreceptors to adapt locally. Unlike bleaching afterimages, the local adaptation afterimages can also be negative, in the sense that adaptation can reduce the response of the photoreceptors. Referring back to FIG. 2A, looking at the crosshair of the output image 205 after fixating the crosshair in the input image 200 produces a local adaptation afterimage 210 where the quadrants corresponding to the bright quadrants of the input image 200 appear darker. The physiological source of local adaptation is a combination of sensitivity loss due to bleaching (bleached pigment does not react to light) and the varying cellular concentration of calcium ions. The model for local adaptation afterimage effects ignores the effect of bleaching on photoreceptor sensitivity, enabling decoupling of the parameters that control bleaching from the parameters that control local adaptation.

Calcium enters the photoreceptor through transduction-controlled ion channels, and is constantly moved out by active pumps. The differential change of intracellular calcium concentration C over time is given by $$\frac{dC}{dt} = c_1 S - c_2 C, \qquad \text{Equation (8)}$$

where $c_1$ and $c_2$ control the influx and efflux of calcium, respectively, and S is the fraction of open ion channels in the photoreceptor's membrane (which is inversely correlated to the magnitude of the photoreceptor's response). In one embodiment, the calcium influx rate $c_1=1$ and the calcium efflux rate $c_2=1$. Using Equation (8) directly can lead to numerical instabilities, so S is instead approximated by 1−R, where R is from Equation (1). The main difference here is that 1−R does not include afterimages, while S does. In our model, we apply the analytical solution to this differential equation to find the updated calcium concentration C' after a simulation timestep of size Δt as follows:

$$C' \leftarrow (C - C_\infty)e^{-c_2 \Delta t} + C_\infty, \quad \text{Equation (9)}$$

where $C_\infty$ is the equilibrium calcium concentration assuming a constant R, i.e., constant stimulus and no global adaptation. $C_\infty$ is given by $$C_\infty = \frac{c_1(1-R)}{c_2} \quad \text{Equation (10)}$$

Similar to the case of bleaching afterimages, we primarily concern ourselves with deviations from the equilibrium calcium concentration $C_\infty$ when determining the appearance of a local adaptation afterimage. We apply a local adaptation gain to the photoreceptor response as computed by:

$$\alpha = \frac{c_{max} - c_\infty}{c_{max} - c} \quad \text{Equation (11)}$$

where $C_{max}=c_1/c_2$, the maximum possible equilibrium calcium concentration (which occurs in total darkness). Note that when $C<C_\infty$, $\alpha<1$, and vice versa. The particular definition of $\alpha$ is chosen because it produces plausible results; other functions that ensure a similar relationship between C, $C_\infty$, and $\alpha$ would be equally reasonable.

Just as with bleaching states, the calcium concentration may be tracked separately for each of the cone types at each pixel. Accordingly, fixating on a strong blue stimulus will lower the sensitivity of the S-cones, while the L- and M-cones adapt to become more sensitive. If later a neutral gray stimulus is presented, the S-cone response will be dampened while the L- and M-cones' response will be boosted, resulting in a yellow percept. Tracking the calcium concentration may be a source of a color-opponent feature of a model for local adaptation afterimage effects. The same principle applies for neutral-color stimuli, which can reduce or increase the sensitivities of small regions of the retina.

Figure 4A:
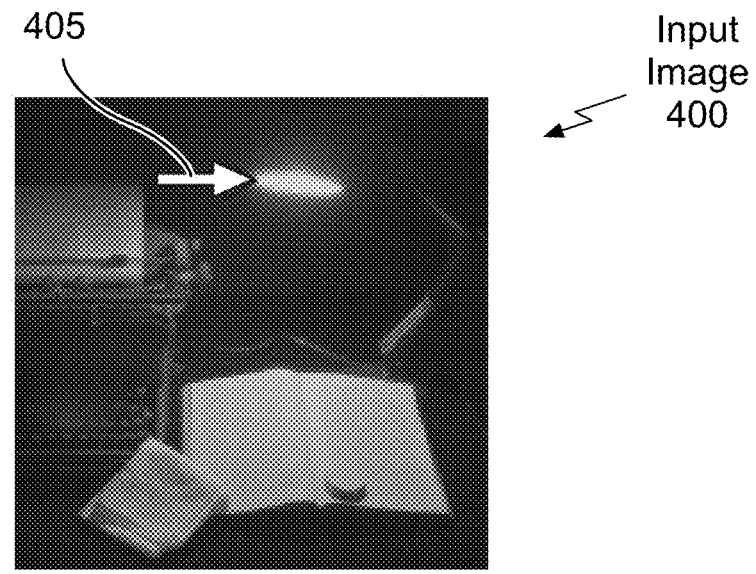
FIG. 4A illustrates a prior art input image to induce a local adaptation afterimage effect.

FIG. 4A illustrates a prior art input image 400 that induces a local adaptation afterimage effect. A viewer fixates on a bright region of the input image 400 indicated by arrow 405. The prior art image is from Fairchild, M. D., 2008, *The HDR Photographic Survey* MDF Publications.

Figure 4B:
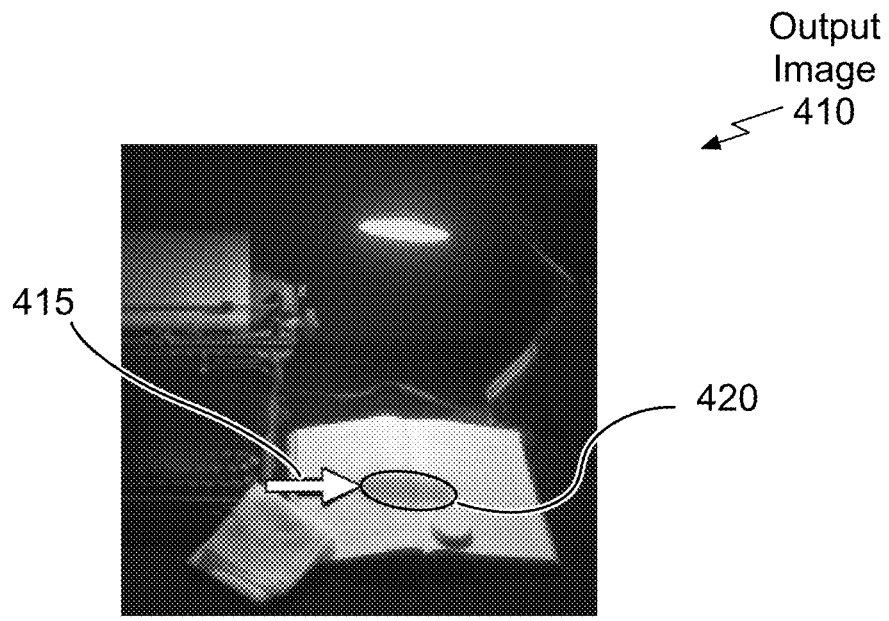
FIG. 4B illustrates an local adaptation afterimage associated with the input image shown in FIG. 4A, in accordance with one embodiment.

FIG. 4B illustrates an output image 410 into which a local adaptation afterimage associated with the input image 400 shown in FIG. 4A is accumulated, in accordance with one embodiment. In one embodiment, the same parameters $c_1$ and $c_2$ ensure that the adaptation afterimage that is computed does not produce unnatural color casts. Long fixations give individual photoreceptors time to adapt. When the gaze moves to a new position, such a viewer gaze change from position 405 of the input image 400 to position 415, the spatially-varying photoreceptor sensitivities manifest themselves as an afterimage of the first fixation. When the input image 400 and the adaptation afterimage associated with the bright white lamp in the input image 400 is accumulated into output image 410, a dark spot 420 appears on the book.

In contrast, a conventional approach may only generate positive afterimages, producing unnatural results. For example, a bright object, such as the bright white lamp in the input image 400 may generate an afterimage that is always brighter than the background, so that the region 420 would appear as a bright spot on the book. To combine the bleaching afterimage effect and the local adaptation afterimage effect, Equation (7) may be modified:

$$J = \alpha^{j_2} \cdot R(I) + j_1 \frac{c}{c_{max}} \max(B - B_\infty, 0) \quad \text{Equation (12)}$$

where $j_2$ controls the strength of the local adaptation afterimages. In one embodiment, the adaptation afterimage strength $j_2=0.15$. Note also that the bleaching afterimage term B is multiplied by the normalized calcium concentration. This modification weakens the appearance of bleaching afterimages in bright situations and strengthens them in low-light situations. FIG. 4E shows the contribution of this term visually. Overall, the model combines simulations of bleaching and local adaptation afterimages to capture the variations in color and time course.

Figure 4C:
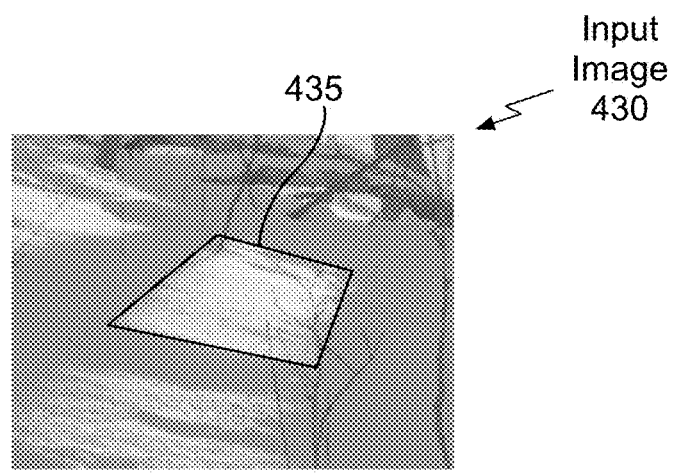
FIG. 4C illustrates a portion of the prior art input image shown in FIG. 3A.

FIG. 4C illustrates a prior art input image 430 that is a portion of the prior art input image 300 shown in FIG. 3A. The prior art image is from Fairchild, M. D., 2008, *The HDR Photographic Survey* MDF Publications. The gain induced by calcium affects the entire transduction process, including cascades initiated by bleached photopigments. The local adaptation afterimages are combined with bleaching afterimages to reflect the induced gain.

Figure 4D:
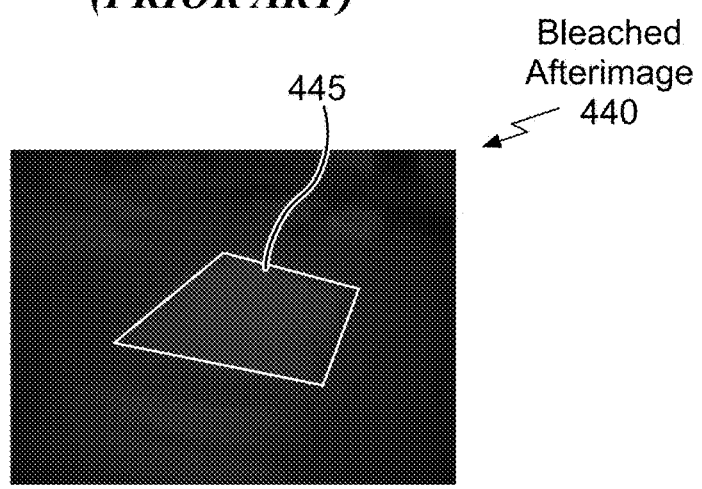
FIG. 4D illustrates a bleaching afterimage associated with the input image shown in FIG. 4C, in accordance with one embodiment.
Figure 4E:
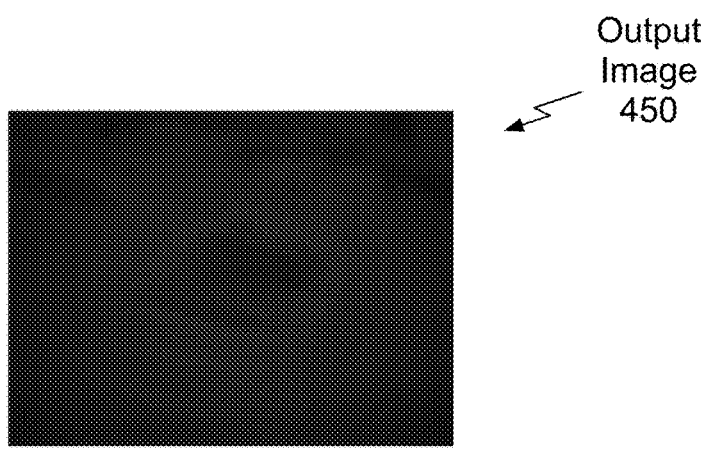
FIG. 4E illustrates an output image that combines the bleaching afterimage shown in FIG. 4D and a local adaptation afterimage associated with the input image shown in FIG. 4C, in accordance with one embodiment.

FIG. 4D illustrates a bleaching afterimage 440 associated with the input image 430 shown in FIG. 4C, in accordance with one embodiment. The local adaptation is not applied to produce the bleached afterimage 440. A bright white region 435 in the input image 430 appears as a green region 445 surrounded by a dark magenta region in the bleached afterimage 440.

FIG. 4E illustrates an output image 450 that combines the bleaching afterimage 440 shown in FIG. 4D and a local adaptation afterimage associated with the input image shown in FIG. 4C, in accordance with one embodiment. The local adaptation term $C/C_{max}$ is applied in Equation (12) to produce the output image 450.

The human visual system operates in three different regimes depending on the light level of the environment. In brightly lit situations ($>10$ cd/m$^2$), the photopic regime is dominant: cones work well, colors are easily distinguished, and spatial visual acuity is maximal. In very dark situations ($<10^{-3}$cd/m$^2$), the scotopic regime is dominant: rods work best, color sensitivity is lost, and spatial acuity is low. Any illumination level between photopic and scotopic is referred to as mesopic, and is characterized by a gradual loss of color sensitivity and acuity.

Three cues intimating the darkness level of the scene may be incorporated into a model: the Purkinje effect, the mesopic hue shift, and the low-light loss of spatial acuity. Some of these cues have been studied before in the context of traditional tonemapping. The Purkinje effect shifts the luminous efficiency function from a peak around 555 nm in photopic conditions to a peak near 507 nm in scotopic conditions, due to the transition from the operating domain of cones to that of the rods. The perceptual effect is to alter the brightness relationships of blue and red stimuli depending on the overall illumination: a red stimulus judged "brighter" than a blue stimulus in photopic conditions may appear "darker" in scotopic conditions. Strictly speaking, the Purkinje effect does not refer to any perceived change in color appearance; it only refers to the change in brightness perception.

The Purkinje effect may be incorporated into a model by modifying the RGB→luminance transform used before applying Equation (1). Photopic luminance, for example, is computed as a weighted sum of RGB values with most weight on the R and G channels. Scotopic luminance, on the other hand, puts little to no weight on R and favors G and B instead. The mesopic luminance may be defined as a blend of the photopic and scotopic luminance. The interaction between rods and cones in the mesopic regime is an active area of study. The luminous efficiency curve may be measured as a function of both wavelength and adaptation level. For simplicity, a luminous efficiency function is assumed to be a linear interpolation weighted by the normalized log-illumination level $\rho$, which is given by $$\rho = \frac{L - m_2}{m_1 - m_2} \qquad \text{Equation (13)}$$

where L is the log-photopic luminance; $m_1$ and $m_2$ denote the upper and lower bounds of the mesopic luminance range in log-units, respectively. In one embodiment, the maximum mesopic log-luminance $m_1=0$ and the minimum mesopic log-luminance $m_2=-2$. Note that when $L \geq m_1$, $\rho \geq 1$, and when $L \leq m_2$, $\rho \leq 0$. For use in a Purkinje effect model, $\rho$ is clamped to lie within the range [0, 1]. The Purkinje effect is difficult to notice and probably has little impact on the perceived realism or brightness of a scene. However, it is a well-documented phenomenon, and may be included in a full display system.

In addition to the Purkinje effect, a loss of color discrimination and a shift in perceived hue accompany mesopic vision, producing a hue shift and desaturation effect. As illumination decreased, the reported color of swatches, including neutral gray ones, appears to drift towards a dull purple color, with some small variation depending on the photopic hue. The ratio between color channels used to reconstruct a color image after global adaptation is replaced with a weighted average of the scene's actual color ratio and the scotopic color ratio of a neutral gray color chip (i.e., a dull purple color), weighted by $\rho$ clamped to [0, 1].

The final cue that may be injected into the system is the loss of spatial acuity in low light. Throughout the mesopic range, spatial acuity drops linearly with log-luminance. The loss in acuity can be explained by the reduced response of the cones and the fact that signals of many rods are aggregated as part of the input to any given ganglion cell on its way to visual centers of the brain.

Figure 5A:
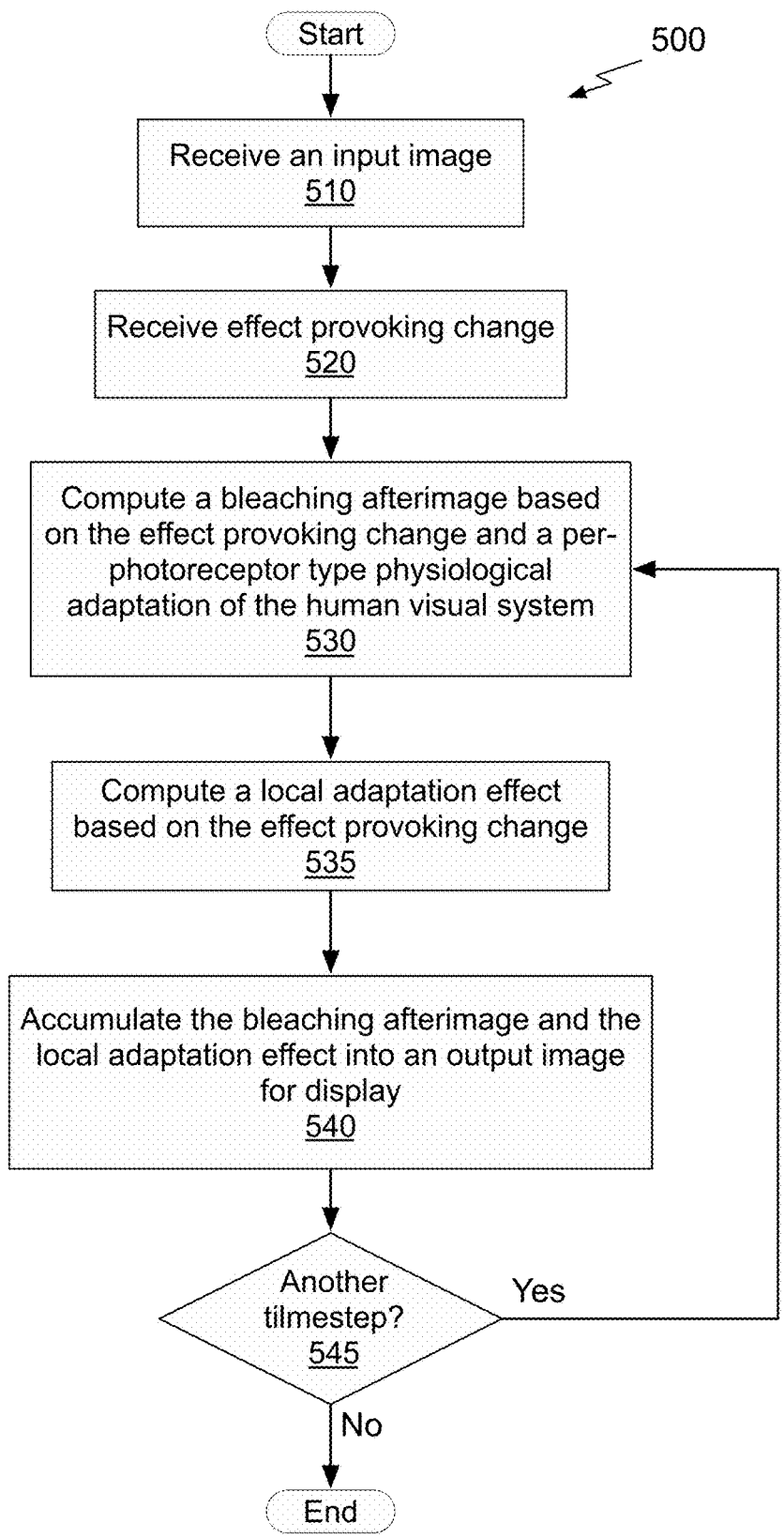
FIG. 5A illustrates a flowchart of a method for producing an image based on based on adaptations of the human visual system, in accordance with another embodiment.

FIG. 5 illustrates a flowchart of a method 500 for producing an image based on adaptations of the human visual system, in accordance with another embodiment. Although the method 500 is described in conjunction with a computing system, persons of ordinary skill in the art will understand that any system that performs method 500 is within the scope of embodiments of the present invention. In one embodiment, a graphics processor is configured to perform method 500. In other embodiments, a central processing unit (CPU) is configured to perform method 500. The method steps may be performed by customized logic circuitry, such as a customized processing pipeline. Alternatively, the method steps may be implemented as instructions or microcode for controlling a processing unit.

At step 510, an input image is received. At step 520, an effect provoking change is received. In the context of the current description, an effect provoking change may be a change in the position of a viewer's gaze or a stimulus input. At step 530, a bleaching afterimage effect is computed based on the effect provoking change and a per-photoreceptor type physiological adaptation of the human visual system. In one embodiment, the bleaching afterimage effect produces a negative afterimage in the output image. Equation (7) may be used to compute the bleaching afterimage effect contribution for each cone type. The bleaching afterimage effect contribution for each cone type may be computed based on a deviation from the equilibrium bleaching level rather than an absolute bleaching level. The bleaching afterimage effect contribution for each cone type may also vary over time.

At step 535, a local adaptation effect is computed based on the effect provoking change. In one embodiment, the local adaptation effect temporarily reduces the gain in the output image after a bright image is viewed or increases the gain in the output image after a dim image is viewed. Equation (12) may be used to compute the local adaptation effect and the bleaching afterimage effect contribution. The contribution due to the local adaptation effect may be computed based on a deviation from the equilibrium calcium concentration rather than an absolute calcium concentration level, as shown in Equation (11). The bleaching afterimage term may be multiplied by the normalized calcium concentration to weaken the appearance of the bleaching afterimage effect, as shown in Equation (12). The local adaptation effect contribution may also vary over time.

At step 540, the bleaching afterimage effect and the local adaptation effect are accumulated into an output image to produce the output image for display. In one embodiment, one or more additional effects are accumulated into the output image. For example, the additional effects may include the Purkinje effect, hue shift and desaturation, and spatial acuity loss.

At step 545, the processor determines if another timestep is simulated, and, if so returns to step 530 to repeat steps 530, 535, and 540 for another timestep to produce an additional output image in a sequence of output images for display. Otherwise, the method terminates.

The viewing environment of a system may affect the quality of the experience. Global adaptation cues are particularly sensitive to ambient illumination. Specifically, the illusion of darkness breaks down whenever the global adaptation level A falls below that of the ambient light, as doing so renders dark objects with implausibly bright pixel values. To prevent this from happening, the viewer's ability to globally adapt to any luminance lower than 100 cd/m$^2$ may be artificially restricted, to roughly correspond to a dimly-lit office.

One consequence of the artificial restriction is that for darker scenes large portions of the screen map to near-zero pixel values. This frequently results in visible quantization bands. In order to hide banding, a standard temporal dithering stage may be implemented before final display.

Figure 5B:
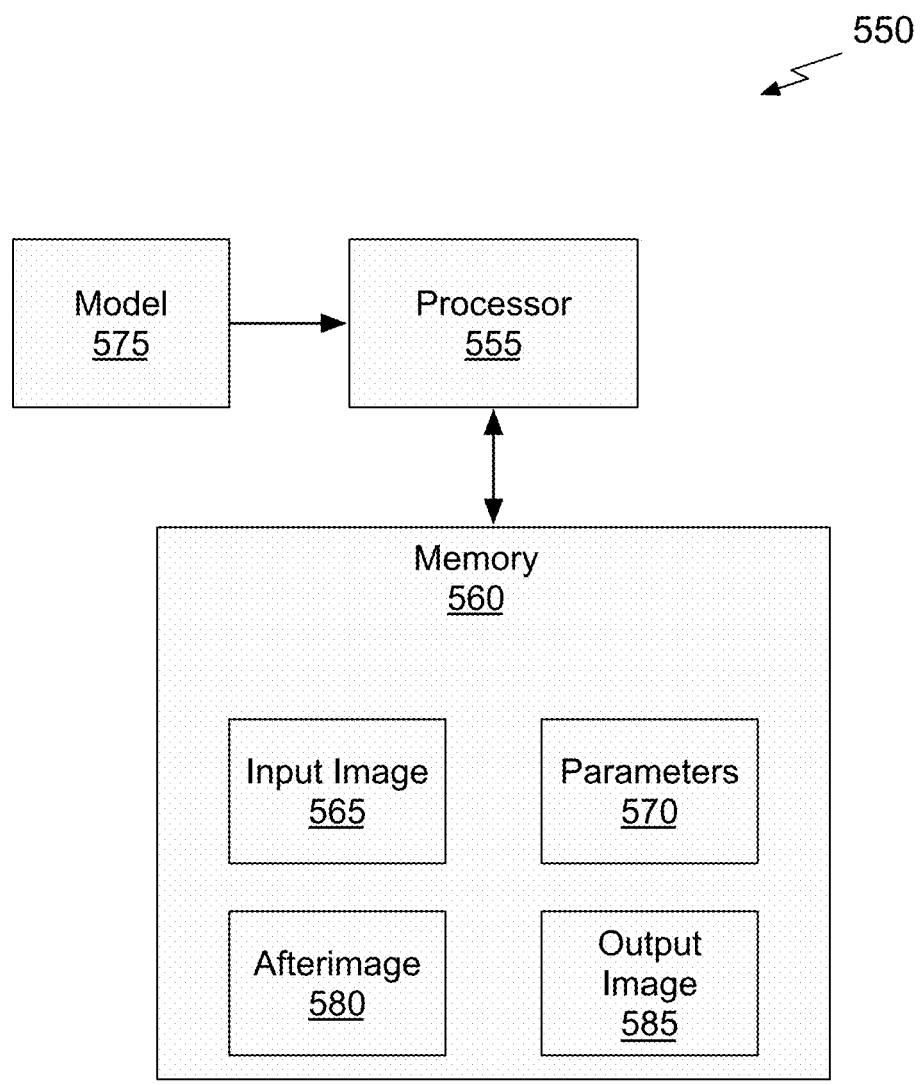
FIG. 5B illustrates a block diagram of a processing system producing an image based on based on adaptations of the human visual system, in accordance with one embodiment.

FIG. 5B illustrates a block diagram of a processing system 550 producing an image based on based on adaptations of the human visual system, in accordance with one embodiment. Processor 555 is configured to execute a model 575 and is coupled to memory 550. The memory 550 may store an input image 565, output image 585, parameters 570 for the model, and an afterimage 580. The processor may execute the model 575 to process an input image 565 based on the parameters 570 to generate the afterimage 580. The afterimage 580 may be accumulated into the output image 585. The input image may be the input image 300, the input image 345, the input image 400, or the input image 430. The afterimage 580 may be one or more of the bleaching afterimages 310, 350, and 440. The output image 585 may be one or more of the output images 410 and 450. The bleaching afterimages 310 or 350 may also be considered output images and may be stored as output image 585. The model 575 may be configured to simulate one or more cumulative effects of human visual adaptation. In particular, the model 575 may be configured to simulate bleaching afterimages and local adaptation effects.

Figure 6:
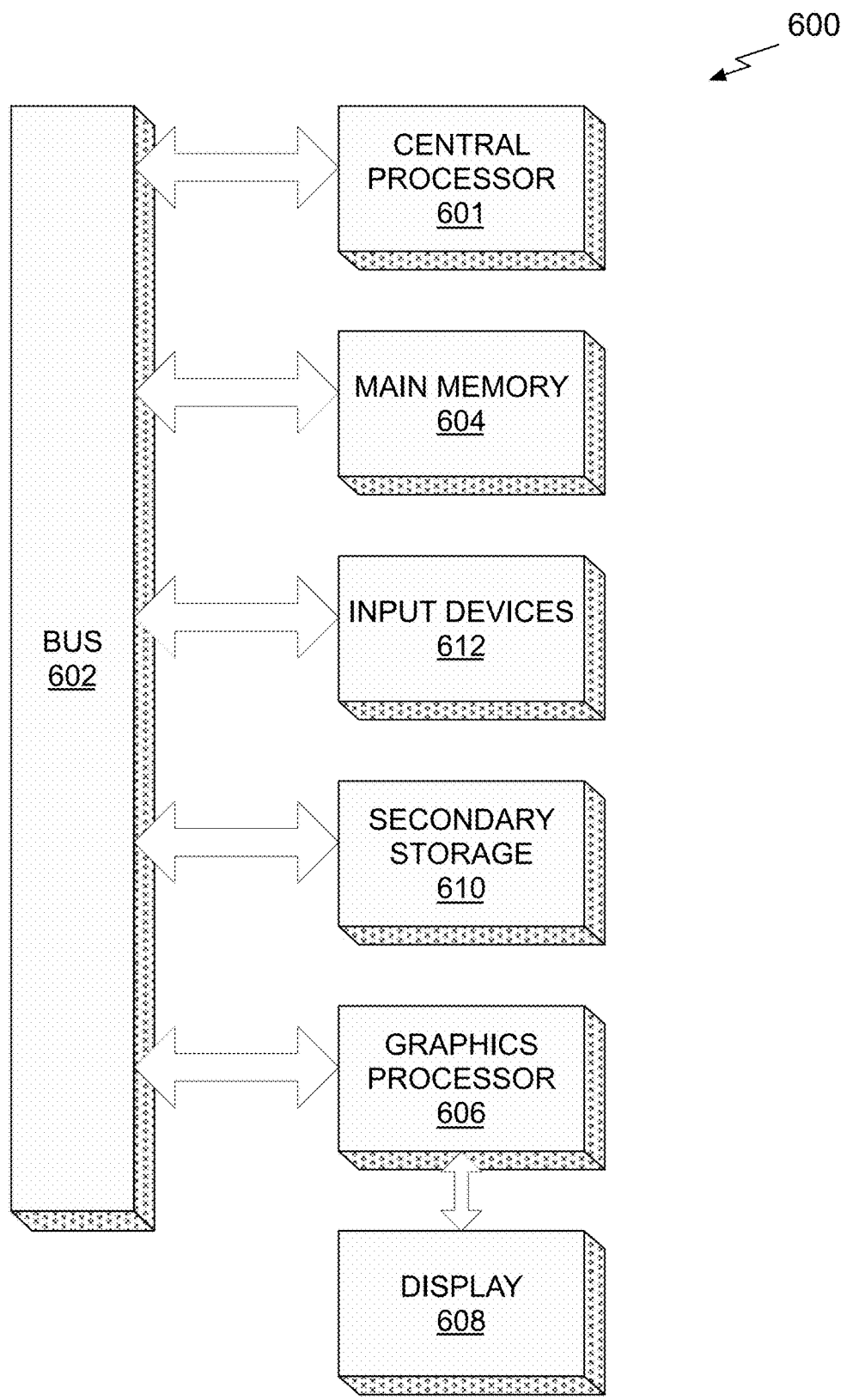
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, gaze tracking, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 also includes a network interface 604 that may be coupled to a network (e.g., a telecommunications network, local area network (LAN), wireless network, wide area network (WAN) such as the Internet, peer-to-peer network, cable network, or the like) for communication purposes. The system 600 may also include storage 610. The storage 610 may include a main memory and/or secondary storage. Control logic (software) and data are stored in the main memory which may take the form of random access memory (RAM). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory and/or the secondary storage. Such computer programs, when executed, enable the system 600 to perform various functions. The storage 610 and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving an input image comprising pixels within a region that is brightly illuminated;
computing, by a processor rendering a phenomenological model, an afterimage corresponding to the region, wherein first colors of pixels in the afterimage correspond to an intensity of the brightly illuminated region;
accumulating the afterimage into an output image, wherein the afterimage brightens the pixels within the region of the output image;
displaying the output image;
computing, by the processor rendering the phenomenological model, a second afterimage, wherein at least a portion of second colors of pixels in the second afterimage are different than the first colors;
accumulating the second afterimage into a second output image; and
displaying the second output image.

2. The method of claim 1, further comprising computing, by the processor rendering the phenomenological model, a local adaptation effect based on the input image.

3. The method of claim 2, further comprising accumulating the local adaptation effect into the output image before displaying the output image.

4. The method of claim 2, wherein the local adaptation effect changes over time.

5. The method of claim 2, wherein the local adaptation effect is a negative afterimage that darkens the pixels.

6. The method of claim 2, wherein the phenomenological model specifies a gain function corresponding to the local adaptation effect, a gain value is computed using the gain function, and the gain value is applied to the first colors.

7. The method of claim 6, wherein a separate gain value is computed for each color channel of a first color space associated with photoreceptors and the color channels are converted into a second color space associated with the display.

8. The method of claim 1, wherein the region of the input image is associated with a camera flash and the afterimage and second afterimage are bleaching afterimages.

9. The method of claim 1, wherein a viewer's gaze changes from a first position to a second position, and the afterimage is located at the first position and the second afterimage is located at the second position.

10. The method of claim 1, wherein the input image is accumulated into the output image before the output image is displayed.

11. The method of claim 1, wherein the phenomenological model specifies a separate bleaching strength parameter for each color channel of a color space associated with the display.

12. The method of claim 1, wherein the phenomenological model specifies a separate bleaching strength parameter for each color channel of a first color space associated with photoreceptors and the color channels are converted into a second color space associated with the display.

13. A non-transitory computer-readable storage medium storing instructions that, when executed by a processor, cause the processor to perform steps comprising:
  receiving an input image comprising pixels within a region that is brightly illuminated;
  computing an afterimage corresponding to the region by rendering a phenomenological model, wherein first colors of pixels in the afterimage correspond to an intensity of the brightly illuminated region;
  accumulating the afterimage into an output image, wherein the afterimage brightens the pixels within the region of the output image;
  displaying the output image;
  computing a second afterimage by rendering the phenomenological model, wherein at least a portion of second colors of pixels in the second afterimage are different than the first colors;
  accumulating the second afterimage into a second output image; and
  displaying the second output image.

14. The non-transitory computer-readable storage medium of claim 13, further comprising computing a local adaptation effect based on the input image by rendering the phenomenological model.

15. The non-transitory computer-readable storage medium of claim 14, further comprising accumulating the local adaptation effect into the output image before displaying the output image.

16. The non-transitory computer-readable storage medium of claim 13, wherein the brightly illuminated region is associated with a camera flash and the afterimage and second afterimage are bleaching afterimages.

17. The non-transitory computer-readable storage medium of claim 16, wherein the afterimage changes over time.

18. A system, comprising:
  a memory configured to store an output image for display and a phenomenological model; and
  a processor that is coupled to the memory and configured to:
    receive an input image comprising pixels within a region that is brightly illuminated;
    compute an afterimage corresponding to the region by rendering the phenomenological model, wherein first colors of pixels in the afterimage correspond to an intensity of the brightly illuminated region;
    accumulate the afterimage into the output image, wherein the afterimage brightens the pixels within the region of the output image;
    transmit the output image to a display;
    compute a second afterimage by rendering the phenomenological model, wherein at least a portion of second colors of pixels in the second afterimage are different than the first colors;
    accumulate the second afterimage into a second output image; and
    transmit the second output image to the display.

19. The system of claim 18, wherein the processor is further configured to render the phenomenological model to compute a local adaptation afterimage effect based on the input image.

20. The system of claim 18, wherein the brightly illuminated region is associated with a camera flash and the afterimage and second afterimage are bleaching afterimages.

* * * * *